(12) United States Patent
Wood et al.

(10) Patent No.: US 10,209,990 B2
(45) Date of Patent: Feb. 19, 2019

(54) CONDITIONAL ATOMIC OPERATIONS IN SINGLE INSTRUCTION MULTIPLE DATA PROCESSORS

(71) Applicant: Advanced Micro Devices, Inc., Sunnyvale, CA (US)

(72) Inventors: David A. Wood, Madison, WI (US); Steven K. Reinhardt, Vancouver, WA (US); Bradford M. Beckmann, Redmond, WA (US); Marc S. Orr, Newcastle, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 442 days.

(21) Appl. No.: 14/728,643

(22) Filed: Jun. 2, 2015

(65) Prior Publication Data
US 2016/0357551 A1 Dec. 8, 2016

(51) Int. Cl.
*G06F 9/52* (2006.01)
*G06F 9/30* (2018.01)
*G06F 9/345* (2018.01)
*G06F 9/38* (2018.01)

(52) U.S. Cl.
CPC ........ *G06F 9/3004* (2013.01); *G06F 9/30072* (2013.01); *G06F 9/30087* (2013.01); *G06F 9/345* (2013.01); *G06F 9/3851* (2013.01); *G06F 9/52* (2013.01); *G06F 9/526* (2013.01)

(58) Field of Classification Search
CPC .................................. G06F 9/52; G06F 9/526
See application file for complete search history.

(56) References Cited

U.S. PATENT DOCUMENTS

| 8,266,382 B1* | 9/2012 | Minkin | G06F 13/28 710/6 |
| 2009/0240860 A1* | 9/2009 | Coon | G06F 9/526 710/200 |
| 2012/0311606 A1* | 12/2012 | Marathe | G06F 9/526 718/107 |
| 2014/0149719 A1* | 5/2014 | Tabaru | G06F 9/3001 712/221 |

(Continued)

OTHER PUBLICATIONS

Alessandro Pellegrini, Francesco Quaglia. "Wait-Free Global Virtual Time Computation in Shared Memory Time Warp Systems" 2014 IEEE 26th International Symposium on Computer Architecture and High Performance Computing; Oct. 22-24, 2014.*

(Continued)

*Primary Examiner* — Jacob Petranek

(57) ABSTRACT

A conditional fetch-and-phi operation tests a memory location to determine if the memory locations stores a specified value and, if so, modifies the value at the memory location. The conditional fetch-and-phi operation can be implemented so that it can be concurrently executed by a plurality of concurrently executing threads, such as the threads of wavefront at a GPU. To execute the conditional fetch-and-phi operation, one of the concurrently executing threads is selected to execute a compare-and-swap (CAS) operation at the memory location, while the other threads await the results. The CAS operation tests the value at the memory location and, if the CAS operation is successful, the value is passed to each of the concurrently executing threads.

20 Claims, 5 Drawing Sheets

(56) References Cited

U.S. PATENT DOCUMENTS

2014/0366033 A1* 12/2014 Nystad ...................... G06F 9/50
                                                          718/104
2015/0100737 A1*  4/2015 Kessler ............... G06F 12/0888
                                                          711/135

OTHER PUBLICATIONS

Sanjeev Kumar et al., "Atomic Vector Operations on Chip Multi-processors", International Symposium on Computer Architecture, Jun. 21, 2008, 12 pages.

Marc S. Orr et al., "Fine-grain Task Aggregation and Coordination on GPUs", Proceeding of the 41st Annual International Symposium on Computer Architecuture, Jun. 14, 2014, 12 pages.

* cited by examiner

CONDITIONAL ATOMIC OPERATIONS IN SINGLE INSTRUCTION MULTIPLE DATA PROCESSORS

BACKGROUND

Field of the Disclosure

The present disclosure relates generally to processors and more particularly to atomic operations for processors.

Description of the Related Art

Processors often employ multiple processing units, such as a central processing unit (CPU) and graphics processing unit (GPU), wherein each processing unit can include multiple cores or other processing modules. The multiple processing units enhance processing efficiency both by providing dedicated hardware for different types of operations (e.g., graphics and display operations executed at the GPU and general computation operations and system management operations executed at the CPU) and by supporting parallel processing of operations. For example, an operating system or other module can divide one or more executing programs into subsets of instructions, referred to as threads, and assign each thread to a different processing unit for execution. At least some of the threads can be executed concurrently (in parallel), thereby increasing the speed with which the one or more programs are executed.

In the course of their concurrent execution, multiple threads may need to access the same memory location at a memory associated with the processor. To prevent race conditions and other errors, the processor can support atomic memory operations, wherein each atomic memory operation, when executed by a thread, appears to other threads as occurring instantaneously or is otherwise not interruptible by other threads. The atomic memory operations can be used in mutual exclusion schemes and other shared memory management schemes to ensure that a memory location is not simultaneously accessed by multiple threads. One class of atomic memory operations is generally referred to as the "fetch-and-phi" class, wherein a fetch-and-phi memory operation atomically fetches and modifies the contents of a memory location. Fetch-and-phi operations are useful in a variety of shared memory management schemes. However, fetch-and-phi operations cannot be executed conditionally, that is, executed or not based on the contents of the memory location being fetched. This lack of conditionality limits the usefulness of fetch-and-phi operations.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for implementing a conditional fetch-and-phi operation at a processor. The conditional fetch-and-phi operation is a conditional operation that tests a memory location to determine if the memory location stores a specified value and, if so, modifies the value at the memory location. In some embodiments, the conditional fetch-and-phi operation is implemented so that it can be concurrently executed by a plurality of concurrently executing threads, such as the threads in a wavefront at a processing module of a GPU. To execute the conditional fetch-and-phi operation, one of the concurrently executing threads is selected to execute a compare-and-swap (CAS) operation at the memory location, while the other threads await the results. The CAS operation tests the value at the memory location and, if the CAS operation is successful, the value is passed to each of the concurrently executing threads. Each thread then adjusts the value by an offset assigned to that thread, thereby completing the fetch-and-phi operation. The resulting modified value can then be used in any of a variety of procedures, such as to access a lock-free circular or bounded queue, that typically employ conventional, non-conditional fetch-and-phi operations or use CAS operations. By making the fetch-and-phi operation conditional, these procedures can be made more robust, while allowing the operation to be executed across a plurality of executing threads.

To illustrate via an example, a queue can be used to communicate information between concurrently executing threads. To access the queue, each of the concurrently executing threads identifies a pointer value that points to the memory location to be accessed. In some implementations, the pointer values are identified by each thread using a non-conditional fetch-and-phi operation. However, the non-conditionality of the fetch-and-phi operation can cause multiple threads to identify the same pointer value, resulting in contention for a particular queue location, or requiring the queue to be locked during access by each thread, reducing overall processor efficiency. Accordingly, in a conventional processor each thread typically employs a CAS operation to identify the requisite pointer values. However, for scenarios with a relatively high number of concurrently executing threads, the correspondingly high number of CAS operations can lead to a large amount of memory traffic as each thread uses the CAS operation to test memory locations storing the pointer values. By implementing a conditional fetch-and-phi operation as described herein, a processor can reduce the amount of memory traffic while allowing the operation to be used for accesses to lock-free queues and other thread synchronization operations.

Figure 1:
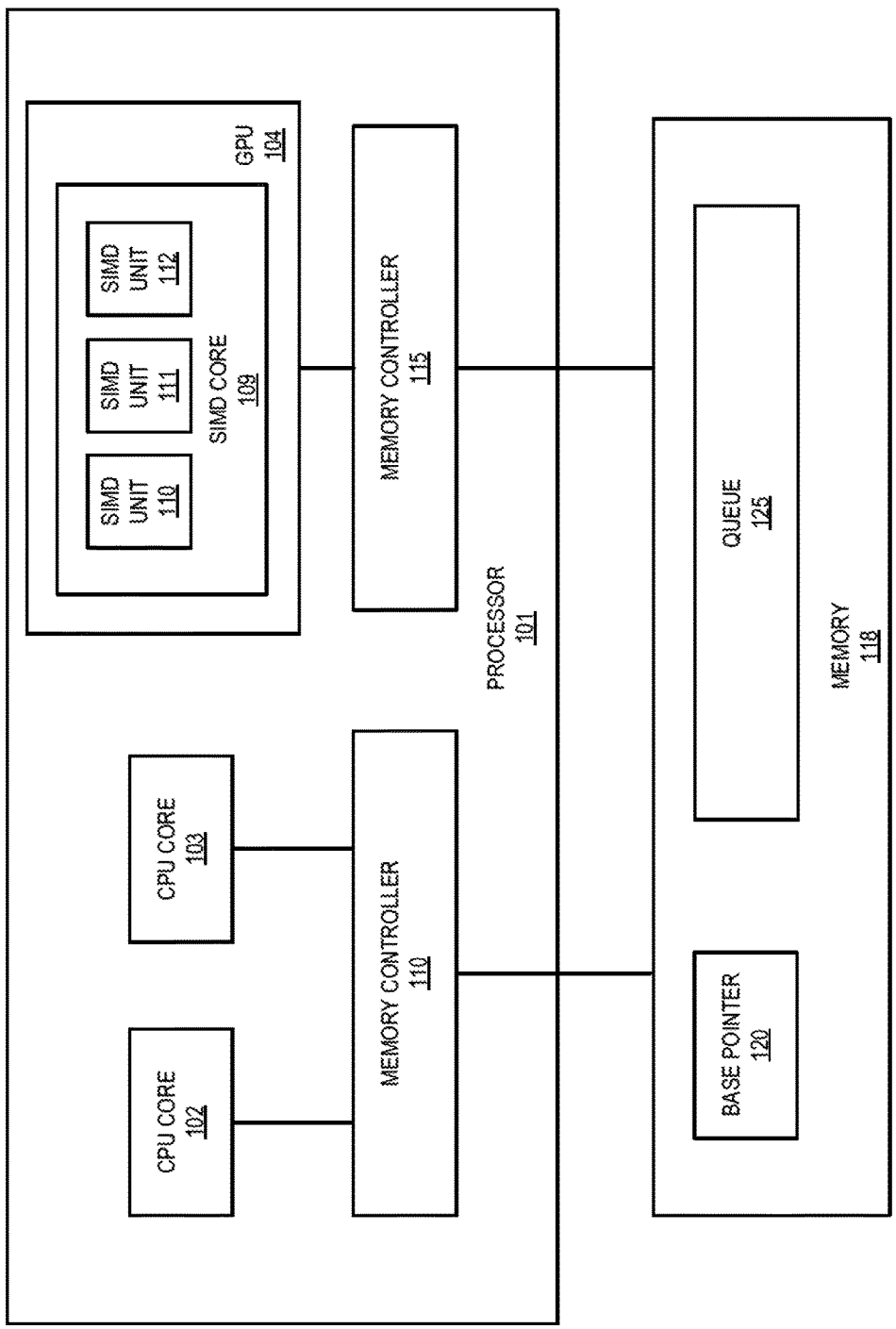
FIG. 1 is a block diagram of a processor that can implement a conditional fetch-and-phi operation in accordance with some embodiments.

FIG. 1 illustrates a processing system 100 including a processor 101 that implements a conditional fetch-and-phi operation in accordance with some embodiments. The processing system 100 can be incorporated into any of a variety of electronic devices, such as a desktop or laptop computer, a server, a game console, a smartphone, a tablet, and the like. The processing system 100 is generally configured to store and execute sets of instructions, organized in the form of computer programs, in order to carry out tasks defined by the sets of instructions.

To facilitate storage and execution of the sets of instructions, the processing system 100 includes the processor 101 and a memory 118. The processor 101 is a general-purpose or application specific processor including hardware resources to execute the sets of instructions. The memory 118 is volatile memory (e.g., random access memory), non-volatile memory (e.g., flash memory), or a combination thereof that stores both the sets of instructions to be executed by the processor 101 and data that is generated or manipulated by the execution of those instructions.

To execute the sets of instructions, the processor 101 includes CPU cores 102 and 103 and a GPU 104, each configured to fetch, execute, and retire instructions of threads. The thread instructions, as well as the data manipulated by the instructions, are stored at the memory 118. The processor 101 includes memory controllers 110 and 115 to provide interfaces between the memory 118 and the CPUs 102 and 103 and the GPU 104, respectively. The memory controllers 110 and 115 can buffer memory access requests (requests to read or write data at the memory 118), buffer responses to memory access requests, manage the control signaling to execute memory access requests at the memory 118, manage memory coherency between different memory modules (not shown) of the processing system 100, and the like.

To improve the speed with which the processing system 100 performs tasks, the hardware of the CPU cores 102 and 103 and the GPU 104 are each designed to more efficiently execute threads associated with programs or tasks of different types. For example, in some embodiments the CPU cores 102 and 103 more efficiently execute threads that require relatively low processing bandwidth, and also require low latency of execution, such as operating system threads and threads of other system management software, threads associated with productivity programs (e.g., word processors), threads associated with system input/output, and the like. The GPU 104 more efficiently executes threads that require relatively high bandwidth and relatively high latency, such as threads associated with video and graphics display processing, vector and array processing, and the like. Accordingly, to improve process efficiency the processor 101 assigns, or schedules, threads to the type of processing unit that will more efficiently execute the thread. Thread scheduling can be performed by an operating system or other scheduling software, by a hardware scheduler (not shown), or a combination thereof.

To execute its scheduled threads, the GPU 104 includes a plurality of single-instruction-multiple data processing cores (referred to as SIMDs), such as SIMD core 109. In some embodiments, the GPU can include processing modules of other types, such as single-instruction-multiple-thread processing cores (SIMTs) in addition to or instead of the SIMDs. Each SIMD core includes a plurality of SIMD unit (e.g. SIMD units 110-112 of SIMD 109). Each SIMD unit includes hardware to execute its scheduled thread concurrently with other SIMD units. A set of threads that executes in lockstep at a set of SIMD units is referred to in the art as a "wavefront". In some embodiments, the threads of a wavefront being executed at the SIMD units each have the same sequence of instructions to be executed on the different data operands. The SIMD units execute the sequence of instructions in lockstep, so that each SIMD unit arrives at a given instruction in the sequence at substantially the same time.

To prevent race conditions and other memory access errors, the threads of a wavefront can employ atomic memory operations, including conditional fetch-and-phi operations, to facilitate communication of data between the threads. For purposes of description, the conditional fetch-and-phi operation, referred to as a "CFP" operation, is described with reference to an example application of conditionally generating pointers to allow a plurality of threads of a wavefront to access a queue 125 at the memory 118. However, it will be appreciated that the CFP operation described herein can be employed in other contexts and operations. In addition, the CFP operation may be initiated by an explicit CFP instruction included in an executing thread by a programmer, may be generated during runtime or during compilation of a program in response to a higher-level instruction, and the like.

In operation, the threads of a wavefront executing at the SIMD 109 use the queue 125 to store data for subsequent retrieval by other threads, such as threads executing at other SIMDs of the GPU 104. The queue 125 thus provides a vehicle for efficient inter-thread communication of data. For example, the threads of a wavefront may each calculate a portion of an array to be stored at the queue 125. To ensure that threads do not attempt to store their respective portions at the same queue entry, each thread needs to generate a different pointer value, pointing to a different location of the queue. The different pointer values can be generated by modifying a base pointer 120 by a different offset for each thread. Accordingly, each thread can generate its pointer value by fetching the base pointer 120 and modifying it by a different offset. However, the threads must first ensure that the memory location storing the base pointer 120 is not being used by another thread, such as a thread executing at the CPU 102, because such modification could result in generation of incorrect pointer values. To generate the pointer values the threads of the wavefront employ a CFP operation. Further, because the threads of the wavefront are executed in lockstep, each thread arrives at a CFP operation in the sequence of thread instructions at substantially the same time. The CFP operation first checks if the base pointer 120 is being modified by another thread. If so, the CFP operation returns an indication that the operation has failed. The threads of the wavefront can then take remedial action, including looping execution of the CFP operation until the operation succeeds. If the check of the base pointer 120 indicates that it is not being modified, the CFP operation modifies the base pointer 120 by a different offset for each thread of the wavefront, thereby generating a pointer to a different location of the queue 125 for each thread.

Figure 2:
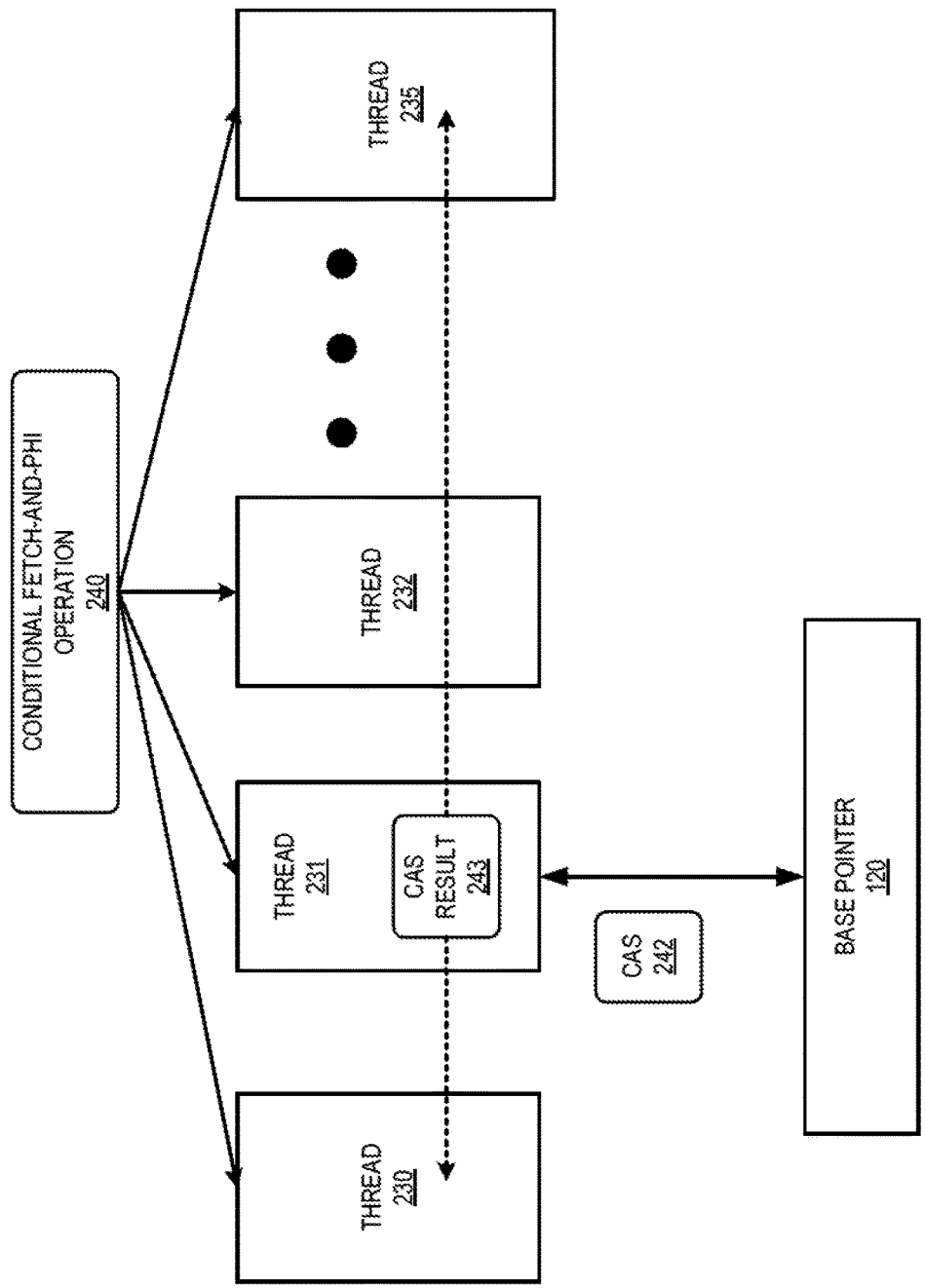
FIG. 2 is a block diagram illustrating implementation of a conditional fetch-and-phi operation for a plurality of executing threads at the processor of FIG. 1 in accordance with some embodiments.

FIG. 2 illustrates an example implementation of a CFP operation 240 in accordance with some embodiments. FIG. 2 depicts a plurality of threads, designated threads 230-235, wherein each of the threads 230-235 is assumed to be executing at one of the SIMD units of the SIMD 109 (FIG. 1). The threads are executing the same sequence of instructions, using different operands, in lockstep. The sequence of instructions includes a CFP operation 240 in order to generate a pointer to the queue 125 based on the base pointer 120. As described further below, the threads 230-235 collectively execute the CFP operation by selecting one of the threads to execute a CAS operation, which broadcasts the results of the CAS operation to the other threads.

To illustrate, in response to arriving at the CFP operation 240, the threads 230-235 collectively identify one of the threads to execute a CAS operation 242. The identification can be made in any of a number of ways, including random selection, selection based on a thread order, and the like. In the illustrated example, thread 231 is the thread selected to execute the CAS operation 242. The threads that were not selected wait for the result of the CAS operation 242 from the thread 231.

The thread 231 executes the CAS operation 242 to test whether the base pointer 120 is being modified by another thread. In some embodiments, the thread 231 does this by reading the base pointer value 120 into a variable, using the CAS operation to swap a new value for the base pointer value 120, and comparing the value returned by the CAS operation 242 to the variable. This test is illustrated by the following example pseudo-code:

```
int curValue = *location;
int nextValue = curValue + wfOperand;
int oldValue = CAS(location, curValue, nextValue);
    if(oldValue == curValue) {
    *success = true;
    } else {
    *success = false;
```

The CAS operation 242 and associated code generates a CAS result 243 that 1) indicates whether the CAS operation 242 was a success (that is, that the base pointer 120 was not being modified by another thread) or a failure (that is, that the base pointer 120 was being modified by another thread); and 2) if the CAS operation 242 was a success, the value of the base pointer 120. The thread 231 provides the CAS result 243 to each of the other threads of the wavefront. In some embodiments, the thread 231 providing the CAS result 243 provides the result via an explicit reduction instruction. Specifically, the leader thread 231 passes the base pointer as an argument to the reduction instruction and the other work-items pass a zero value to the reduction instruction. After execution of the reduction completes, all work-items (230-235) in the group have the value of the CAS result 243.

If the CAS result 243 indicates a failure, the leader thread 231 can loop on the CFP operation 240 until the CAS result 243 indicates success. In response to the CAS result 243 indicating a success, each thread modifies the value of the base pointer 120 by its assigned offset value. The form of modification depends on the type of the CFP operation 240. For example, in some embodiments the CFP operation 240 is a conditional fetch-and-add operation, and each thread adds its assigned offset value to the value of the base pointer 120, as returned via the CAS result 243.

Thus, in the illustrated example of FIG. 2, the GPU 104 executes a fetch-and-phi operation for each thread of a wavefront in a conditional manner, so that each thread modifies the base pointer 120 only if that pointer is not being modified by another thread. This reduces the likelihood of errors in accesses to the queue 125. Further, the GPU 104 executes the fetch-and-phi operation by using only one CAS operation for all the threads of a wavefront. This reduces memory access traffic relative to an implementation where each thread generates its own CAS operation to test the availability of the base pointer 120.

Figure 3:
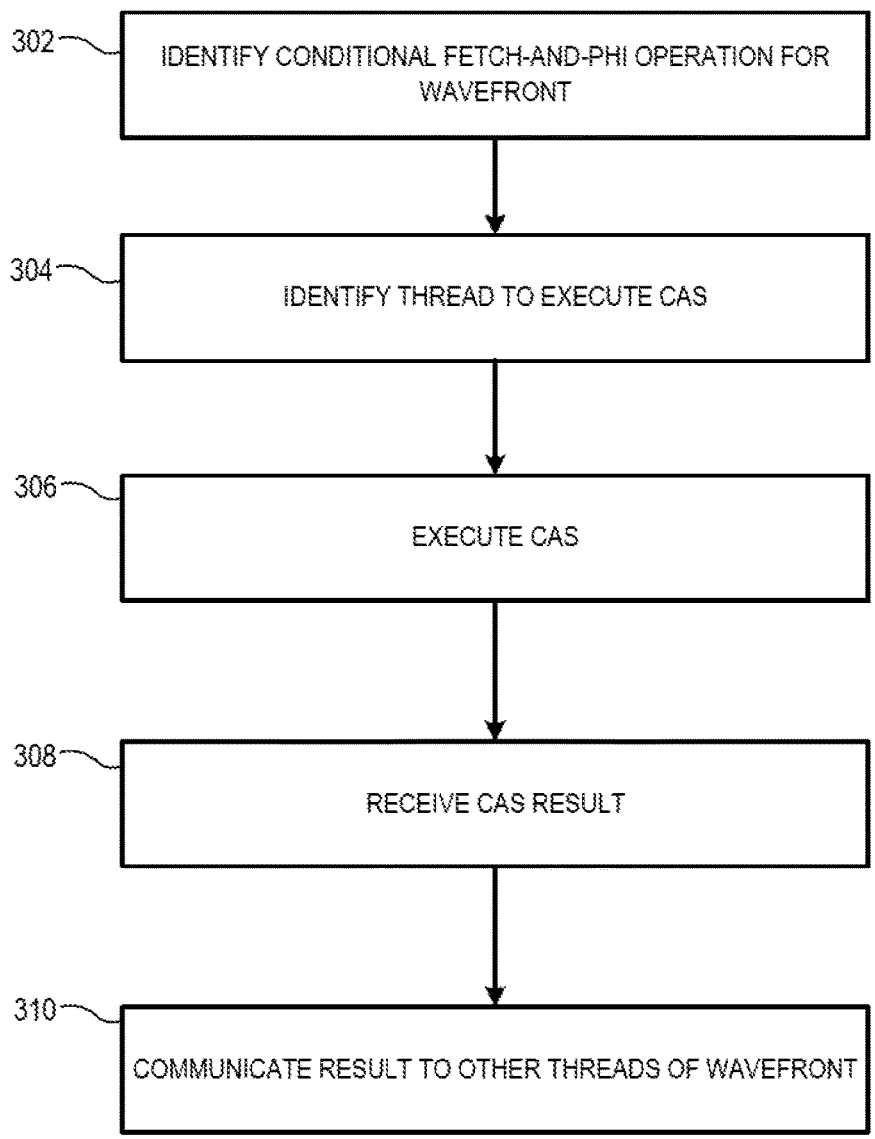
FIG. 3 is a flow diagram of a method of executing a conditional fetch-and-phi operation in accordance with some embodiments.

FIG. 3 illustrates a flow diagram of a method 300 of executing a CFP operation for a wavefront at the GPU 104 of FIG. 1. At block 302 the threads of the wavefront concurrently arrive at CFP operation. At block 304 the threads collectively identify one thread of the wavefront as a leader thread to execute a CAS operation to test the memory location targeted by the CFP operation. At block 306 the identified thread executes the CAS operation at the targeted memory location. At block 308 the identified thread compares the value returned by the CAS operation to the value previously stored at the targeted location to determine if the CAS operation was a success or failure. At block 310 the identified thread communicates the result of the CAS operation to the other threads via a reduction instruction, wherein the result indicates one or both of 1) a success result indicating whether the CAS operation was a success and 2) the value returned by the CAS operation. If the CAS operation was a success, each thread then modifies the returned value by a corresponding offset in order to complete the CFP operation for that thread.

Figure 4:
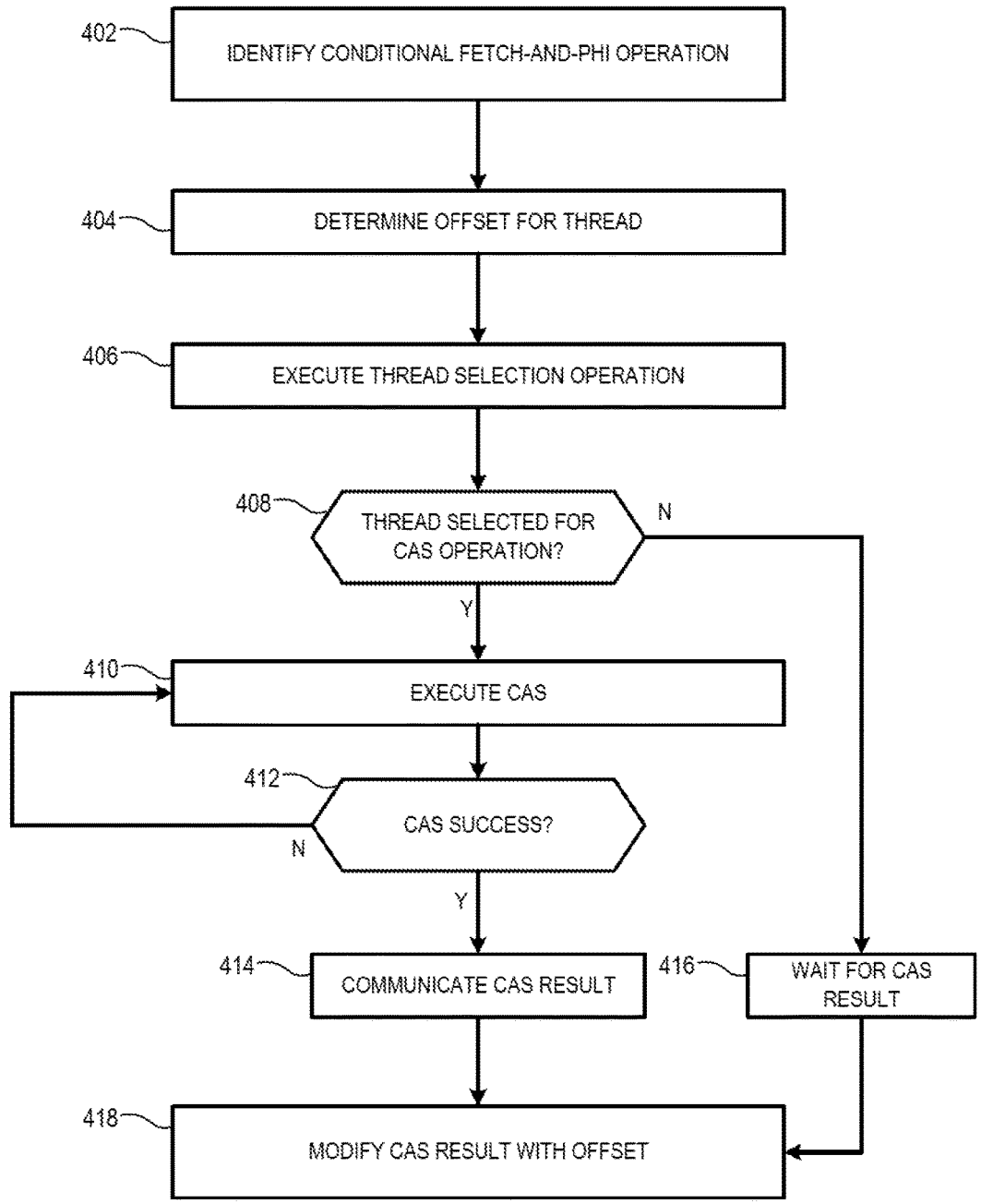
FIG. 4 is a flow diagram of a method of communicating results of a conditional fetch-and-phi operation in accordance with some embodiments

FIG. 4 illustrates a flow diagram of a method 400 of executing a CFP operation at an individual thread of a wavefront. At block 402 the thread identifies that it has arrived at a CFP operation to, for example, generate a pointer value to access a queue, wherein the pointer value is to be generated by modifying a base pointer value stored in memory. The CFP operation is to test the base pointer value to see if it is available (that is, not being modified by another thread) and, if so, to fetch the base pointer value and modify it by an offset. At block 404 the thread identifies the offset by which the fetched value is to be modified. In some embodiments, the offset value can be passed as an argument to the CFP operation. In some embodiments, each thread of the wavefront generates a unique offset by coordinating offset generation with the other threads of the wavefront.

At block 406 the thread executes a thread selection operation to identify whether it has been selected as the thread to execute a corresponding CAS operation. At block 408, the thread determines, based on the result of the thread selection operation, if it has been selected. If not, the method flow moves to block 416 and the thread awaits the results of the CAS operation from the thread that has been selected. Returning to block 408, if the thread has been selected, the method flow moves to block 410 and the thread executes a CAS operation at the memory location targeted by the CFP operation. The CAS operation returns a result indicating success or failure and, if a success, the contents of the memory location. At block 412 the thread identifies if the CAS result indicates a success. If not, the method flow returns to block 410 and the thread again executes the CAS operation. Thus, the thread repeatedly executes the CAS operation until the CAS result indicates that the targeted memory location is not being modified by another thread. If, at block 412, the CAS result indicates a success, the method flow moves to block 414 and the thread communicates the value returned by the CAS operation to each of the threads of the wavefront. At block 416, each thread of the wavefront modifies the value returned by the CAS result by its corresponding offset to complete the CFP operation. The CFP operation can return the modified result for use as, for example, a pointer to a queue location or other data.

In some embodiments, the apparatus and techniques described above are implemented in a system comprising one or more integrated circuit (IC) devices (also referred to as integrated circuit packages or microchips), such as the processor described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
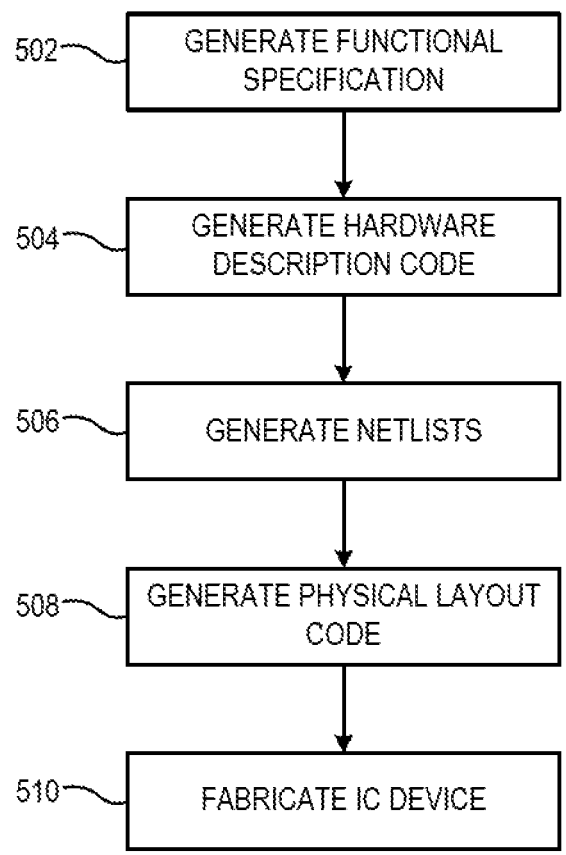
FIG. 5 is a flow diagram illustrating a method for designing and fabricating an integrated circuit device implementing at least a portion of a component of a processing system in accordance with some embodiments.

FIG. 5 is a flow diagram illustrating an example method 500 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments.

However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to a request to execute conditionally a first atomic operation for a plurality of threads at a processor:
   selecting, at the processor, a first thread of the plurality of threads to execute a second atomic operation, wherein the second atomic operation is a conditional operation whose completion depends on contents of a memory location targeted by the second atomic operation; and
   executing, at the processor, the second atomic operation at the first thread.

2. The method of claim 1, further comprising:
   selecting the first thread from among the plurality of threads to execute the second atomic operation.

3. The method of claim 2, further comprising:
   providing a result of the second atomic operation executed at the first thread to other threads of the plurality of threads.

4. The method of claim 3, wherein providing the result of the second atomic operation comprises:
   indicating a success result of the second atomic operation to the other threads.

5. The method of claim 3, wherein providing the result comprises:
   providing the result of the second atomic operation to the other threads via execution of a reduction instruction.

6. The method of claim 2, wherein the first atomic operation is a fetch-and-phi operation.

7. The method of claim 6, wherein the first atomic operation is a fetch-and-add operation.

8. The method of claim 6, wherein the second atomic operation is a compare-and-swap operation.

9. A method, comprising:
   receiving a request to execute a fetch-and-phi operation for each of a plurality of threads concurrently executing at a processor; and
   in response to the request to execute the fetch-and-phi operation, executing, at the processor, a compare-and-swap (CAS) operation whose completion depends on contents of a memory location targeted by the CAS operation at a selected one of the plurality of concurrently executing threads.

10. The method of claim 9, further comprising:
    communicating a result of the CAS operation to each of the plurality of concurrently executing threads to indicate a success or failure of the fetch-and-phi operation.

11. The method of claim 10, wherein communicating the result of the CAS operation comprises communicating the result via a reduction instruction.

12. The method of claim 9, further comprising:
    communicating a value returned by the CAS operation to each of the plurality of concurrently executing threads.

13. The method of claim 12, further comprising:
    modifying the value returned by the CAS operation at each of the plurality of concurrently executing threads by a different offset.

14. A non-transitory computer readable storage medium embodying a set of executable instructions, the set of executable instructions to manipulate at least one processor to:
    in response to a request to execute conditionally a first atomic operation for a plurality of threads at a processor, the first atomic operation being a non-conditional operation:
    select a first thread of the plurality of threads; and
    execute a second atomic operation at the first thread, wherein the second atomic operation is a conditional operation whose completion depends on contents of a memory location targeted by the second atomic operation.

15. The computer readable medium of claim 14, further comprising:
    instructions to manipulate the at least one processor to provide a result of the second atomic operation to a second thread of the plurality of threads.

16. The computer readable medium of claim 15, further comprising:
    instructions to manipulate the processor to indicate a success result of the second atomic operation to the second thread.

17. The computer readable medium of claim 15, wherein instructions to provide the result of the second atomic operation comprise instructions to instructions to manipulate the processor to provide the result of the second atomic operation to each of the plurality of threads via a reduction instruction.

18. The computer readable medium of claim 15, wherein the first atomic operation is a fetch-and-phi operation.

19. The computer readable medium of claim 18, wherein the second atomic operation is a compare-and-swap operation.

20. The computer readable medium of claim 18, wherein the first atomic operation is a fetch-and-add operation.

* * * * *